(12) United States Patent
Sayman

(10) Patent No.: US 10,567,844 B2
(45) Date of Patent: Feb. 18, 2020

(54) CAMERA WITH REACTION INTEGRATION

(71) Applicant: Facebook, Inc., Menlo Park, CA (US)

(72) Inventor: Michael Arthur Sayman, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 15/442,351

(22) Filed: Feb. 24, 2017

(65) Prior Publication Data

US 2018/0249218 A1    Aug. 30, 2018

(51) Int. Cl.
| | | |
|---|---|---|
| *G06K 9/03* | (2006.01) | |
| *H04N 21/4788* | (2011.01) | |
| *H04N 21/4223* | (2011.01) | |
| *H04N 21/472* | (2011.01) | |
| *H04N 21/482* | (2011.01) | |
| *H04N 21/84* | (2011.01) | |

(52) U.S. Cl.
CPC ..... *H04N 21/4788* (2013.01); *H04N 21/4223* (2013.01); *H04N 21/47205* (2013.01); *H04N 21/4828* (2013.01); *H04N 21/84* (2013.01)

(58) Field of Classification Search
None
See application file for complete search history.

(56) References Cited

U.S. PATENT DOCUMENTS

| | | | |
|---|---|---|---|
| 2003/0108241 A1* | 6/2003 | Colmenarez | G06F 17/30265 382/181 |
| 2007/0067295 A1 | 3/2007 | Parulski | |
| 2010/0088616 A1* | 4/2010 | Park | G06F 3/0236 715/762 |
| 2010/0262597 A1 | 10/2010 | Han | |
| 2011/0058713 A1* | 3/2011 | Kogane | G06K 9/00308 382/118 |
| 2016/0080298 A1 | 3/2016 | Oh | |
| 2017/0208362 A1* | 7/2017 | Flores | H04N 21/44218 |
| 2018/0075876 A1* | 3/2018 | Chintalapoodi | G06K 9/00315 |

FOREIGN PATENT DOCUMENTS

KR    10-2012-0028491    3/2012

OTHER PUBLICATIONS

International Search Report and Written Opinion for International Application PCT/US2017/058442, dated Jan. 31, 2018.

* cited by examiner

*Primary Examiner* — Cai Y Chen
(74) *Attorney, Agent, or Firm* — Baker Botts L.L.P.

(57) ABSTRACT

In one embodiment, a method includes a client device receiving a selection of an emotion capture button. The emotion capture button is associated with an emotion. In response to the receiving the selection of the emotion capture button, the client device captures a video clip designated with a categorization specifying the emotion associated with the selected emotion capture button.

27 Claims, 6 Drawing Sheets

CAMERA WITH REACTION INTEGRATION

TECHNICAL FIELD

This disclosure generally relates to capturing video clips on a device.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

A mobile computing device—such as a smartphone, tablet computer, or laptop computer—may include functionality for determining its location, direction, or orientation, such as a GPS receiver, compass, gyroscope, or accelerometer. Such a device may also include functionality for wireless communication, such as BLUETOOTH communication, near-field communication (NFC), or infrared (IR) communication or communication with a wireless local area networks (WLANs) or cellular-telephone network. Such a device may also include one or more cameras, scanners, touchscreens, microphones, or speakers. Mobile computing devices may also execute software applications, such as games, web browsers, or social-networking applications. With social-networking applications, users may connect, communicate, and share information with other users in their social networks.

SUMMARY OF PARTICULAR EMBODIMENTS

Particular embodiments provide techniques to capture a video clip that is designated with a categorization specifying a selected emotion by a user. In an embodiment, a client device receives a selection of an emotion capture button, wherein the emotion capture button is associated with an emotion. In response to receiving a selection of the emotion capture button, the client device captures a video clip designated with a categorization specifying the emotion associated with the selected capture button.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1:
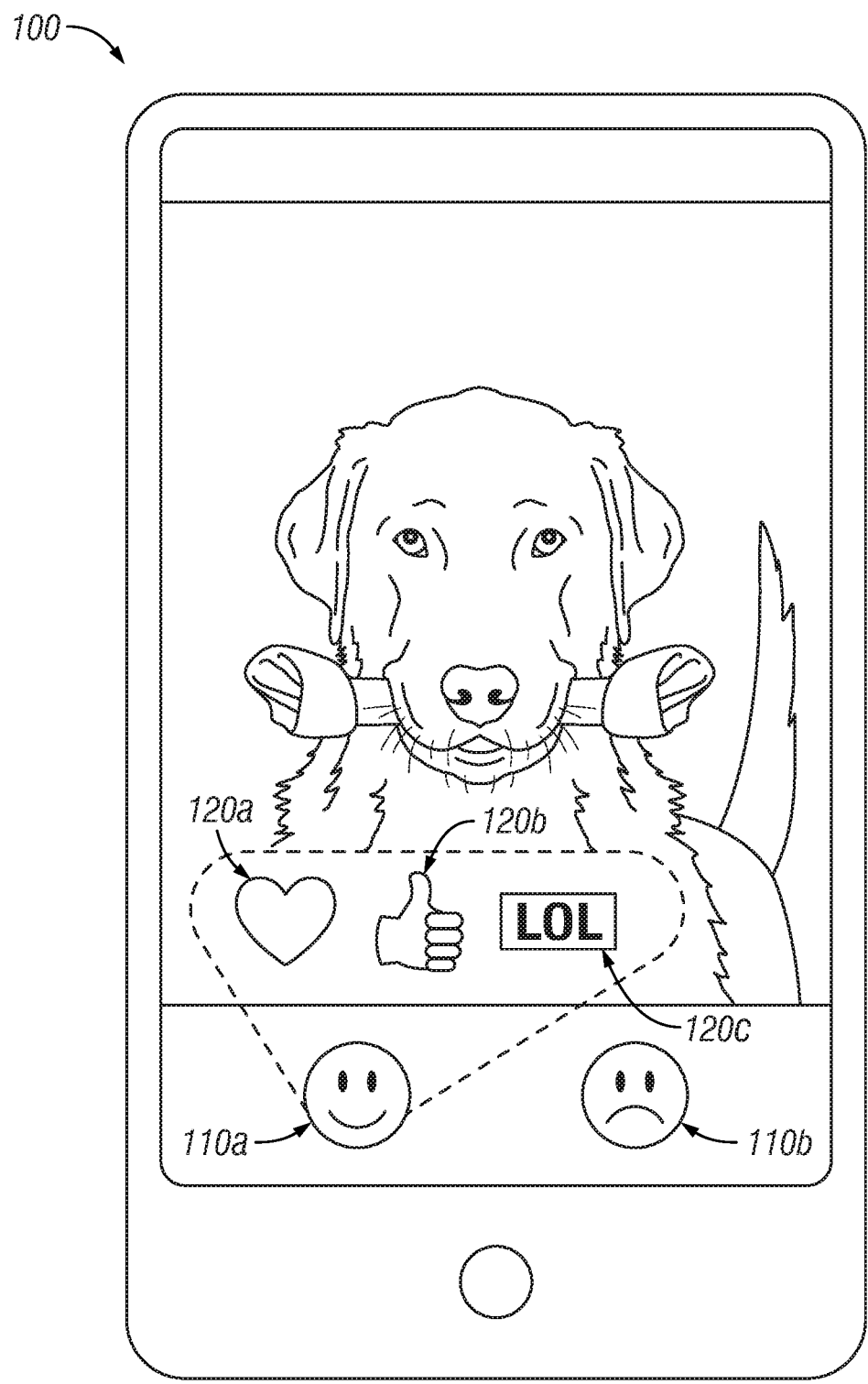
FIG. 1 is an example user interface of a client device that may capture a video clip by selecting an emotion capture button.

A user may capture a video clip by using, for example, a mobile computing device. Typically, a user captures a video clip but fails to associate an emotion with the video clip. Moreover, ascribing an emotion to a video clip after capturing the video clip may be problematic, because users may forget the emotion expressed at the time of video capture, may forget to ascribe an emotion to the video, or ascribe an emotion that is too latent for its intended purpose.

Accordingly, particular embodiments provide techniques to capture a video clip that is designated with a categorization specifying a selected emotion by a user. In an embodiment, a client device receives a selection of an emotion capture button, wherein the emotion capture button is associated with an emotion. In response to receiving a selection of the emotion capture button, the client device captures a video clip designated with a categorization specifying the emotion associated with the selected capture button.

In an exemplary embodiment, a client device receives a selection of an emotion capture button. The client device may display a plurality of emotion capture buttons, and the user may select an emotion capture button from the plurality of emotion capture buttons. The emotion capture button may be associated with an emotion, such as being happy or being disgusted. Typically, each emotion capture button is associated with a separate emotion. In certain embodiments, the emotion capture button is a graphical representation of the associated emotion, such as a smiley face or a poop emoji.

The emotion associated with the emotion capture button is a representation of a state of mind associated with the user taking the video. Typically, the emotion captures a reaction towards an object, item, or scenario captured by the ensuing video clip. The various emotion capture buttons and emotions may be preset or may be created and customized by the user.

The user may select the emotion capture button by tapping on a graphical representation of the emotion capture button on a graphical user interface, selecting a physical button on a user device, vocalizing a statement that is captured by a voice recognition software on a user device, expressing a non-verbal gesture that is captured by a gesture interpretation software on a user device, or any other indication by the user to the user device that indicates the selection of an emotion capture button and/or emotion.

In certain embodiments, the client device may display a plurality of emotion capture categories with each category representing a grouping of emotion capture buttons. For example, an angry emotion category may comprise a rage emotion capture button, an angry emotion capture button, and an annoyance emotion capture button. Similarly, a happy emotion category may comprise an ecstatic emotion capture button, a joyful emotion capture button, and a serene emotion capture button. When the client device receives user input in conjunction with a selected one of the emotion capture categories, client device may display the group of emotion capture buttons represented by the selected emotion capture categories.

In response to receiving the selection of the emotion capture button, client device may capture a video clip and designate the video clip with a categorization specifying the emotion associated with the selected emotion capture button. Client device may capture a video clip by recording a video clip through an embedded camera, through an attached camera, by selecting a multimedia content on the client device, or any other method for the client device to ascertain a video clip. In certain embodiments, the client device captures the video clip during the duration of the emotion capture button selection. For example, the selection of the emotion capture button may initiate a video capture and the video capture may continue until the emotion capture button is deselected. Client device may also concurrently associate a capture button selection while recording a video for Facebook Live™. The emotion capture button may also be pressed while a user is already recording a video clip. For example, a user device may associate the time that the emotion capture button is selected with the time frame in the entire captured video, or alternatively, the entire captured video may be associated with selection of the emotion capture button. Client device may also designate the video clip with a categorization specifying the emotion associated with the selected emotion capture categories.

In certain embodiments, client device designates the video clip with a categorization by modifying the metadata of the video clip to include the emotion associated with the selected emotion capture button. Moreover, the associated metadata may also include other information about the video, such as the location data and/or time associated with the video. In other embodiments, client device may modify a file or a record associated with the video clip to include the emotion associated with the emotion associated with the selected emotion capture button. Client device may also instantaneously upload the emotion associated with the captured video while uploading the captured video to a content-distribution system. Moreover, client device may use an identifier associated with the captured video clip to associate the emotion with the video clip's identifier.

Client device may detect objects in the video clip. For example, client device may use algorithms to recognize instances of objects. Client device may identify one or more objects in a video capture by detecting the edges of an object, changes in lighting, greyscale matching, or any other methods to identify objects in a video clip.

In particular embodiments, an image-recognition process may identify the visual features (e.g., objects) of the video clip and associate them with concepts. In certain embodiments, a concept may be an object in a video clip. As an example and not by way of limitation, a client device and/or content-distribution system may identify visual features (e.g., shape, color, texture) in the video clip associated with a video clip and may determine, based on an image-recognition process that uses the visual features as inputs, that the video clip is associated with a concept "Dog." More information on determining social-graph concepts in images may be found in U.S. patent application Ser. No. 13/959,446, filed 5 Aug. 2013, and U.S. patent application Ser. No. 14/983,385, filed 29 Dec. 2015, each of which is incorporated by reference. In particular embodiments, the context associated with the video clip may be determined based on associations between a context associated with the video clip and one or more previously-existing concepts. As an example and not by way of limitation, a video clip posted on a page or interface related to a concept "Batman" may be associated with that concept. In particular embodiments, social-graph concepts may be determined based on one or more audio features of a video clip. As an example and not by way of limitation, a speech-recognition process may recognize the word "dog" being spoken by a person in the captured video, in which case, the social-networking system 160 may associate the video clip with the social-graph concept "Dog." As another example and not by way of limitation, a voice-recognition process may recognize the voice of a particular person (e.g., a user, a celebrity) and associate the video clip with a concept that describes that person (e.g., the social-graph concept that corresponds directly to the user or the celebrity). As another example and not by way of limitation, an audio-recognition process may detect that the video clip associated with the video clip includes a song by the artist Cat Stevens, in which case the client device and/or content-distribution system may associate the video clip with the concept "Cat Stevens." In particular embodiments, associated social-graph concepts may be determined based on text associated with the video. As an example and not by way of limitation, the text may have been extracted from communications associated with the video clip. As another example and not by way of limitation, the text may have been extracted from metadata (e.g., the filename, time and location of upload, etc.) associated with the video clip or text directly associated with the video clip (e.g., the title, a description, etc.). In these examples, client device and/or content-distribution system may determine associated social-graph concepts by using a topic index to match the extracted text with keywords indexed with respective concepts, and may determine the vector representation based on these concepts. More information on using a topic index to determine concepts associated with text may be found in U.S. patent application Ser. No. 13/167,701, filed 23 Jun. 2011, and U.S. patent application Ser. No. 14/561,418, filed 5 Dec. 2014, each of which is incorporated by reference. In particular embodiments, associated social-graph concepts may be determined based on information associated with one or more users associated with the video clip. As an example and not by way of limitation, a video clip created by a user who with profile information indicating an interest in boxing may be associated with the concept "Boxing" or any other suitable concepts.

Client device may provide a graphical illustration of the object for user to select. For instance, an outline of the object may appear with an illustration of the emotion capture buttons. The user may select the emotion capture button to associate the emotion associated with the emotion capture button to the detected object. The emotion capture button may be any type of video, audio, or textual representation on a user device that a user can select to associate an emotion with a video capture.

In certain embodiments, the client device may transmit video information to the content-distribution system. Various video information may be associated with the captured video clip and transmitted to the content-distribution system. For example, video information may comprise location data associated with the captured video clip; time associated with the captured video clip, resolution associated with the captured video clip; detected objects, video information, and/or concepts associated with the captured video clip; the categorization specifying the emotion associated with the selected emotion capture button for the captured video clip; and any other information that may be relevant or associated with the captured video clip.

Video information may also include automatically captured information associated with the captured content. In certain embodiments, video information may also contain user-generated information (e.g., date, time, location, tags, etc.), EXIF data, and information generated by content-distribution system. For example, content-distribution system may access the EXIF data associated with captured content and generate video information from the EXIF data. For instance, content-distribution system may access the location data in EXIF data, and then associate the location data with a known specified location (e.g., "Half Dome, Yosemite National Park, California"). As another example, video information may comprise tags generated by capturing user or viewing users.

Client device may communicate the captured video clip alongside the categorization specifying the emotion to a content-distribution system. Client device may communicate the video clip with its metadata containing the categorization specifying the emotion, the video clip and associated video information, or any other method such that the video clip and its categorization are communicated to the content-distribution system.

Content-distribution system may be one or more servers that store and serve content to users. In certain embodiments, a content-distribution system comprises a social networking system or may be linked to a social networking system. In particular embodiments, a content-distribution system may include an authorization server (or other suitable component(s)) that allows an authorized user to upload and share a captured video clip. In particular embodiments, content-distribution system may be a network-addressable computing system that can host video clips. In particular embodiments, content-distribution system may store one or more content graphs.

Figure 4:
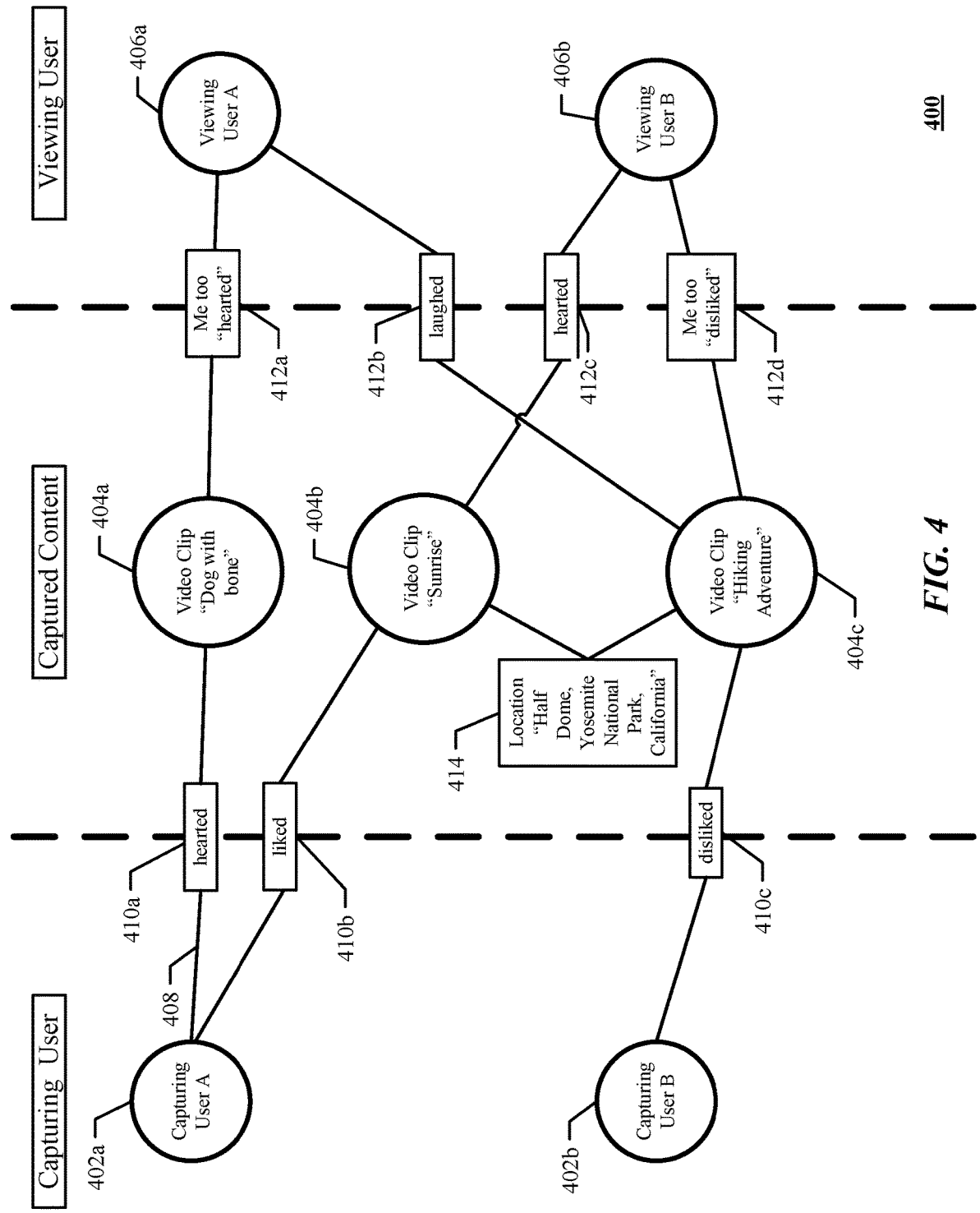
FIG. 4 illustrates an example content graph.

Content-distribution system may also index, store, and create connections between received video clips and the associated user emotion. Content-distribution system, in particular, may develop a content graph. The first social-graph node may be the captured video clip and/or detected objects in the video clip. The second social-graph node may represent a user associated with the client device and/or an object in the video clip. The links between the first social-graph node and the second social-graph node may be the user's emotion associated with the video clip. In addition, viewing users that view the video clip may also react to the video. Links may also exist between a second social-graph node representing the viewing user and the associated viewing user's reaction to the video clip. A viewing user may also provide a "me too" reaction which allows a viewing user to agree with the capturing user's emotion to the video. Moreover, links between the video may exist based on the geographical location of the video, time of the video, detected objects of the video, or any other type of information that may relate one video to another. FIG. 4 and its accompanying description provide a more detailed description of a content graph.

Content-distribution system may also statistically analyze the content graph to identify certain trends or statistics. For example, content-distribution system can provide third parties with data showing that individuals either like a specific area or dislike a specific area based on the associated emotions of captured videos taken during certain time periods and locations. Using statistical analysis, content-distribution system may be able to determine what locations appear to frequently register happy moments with users or places that frequently register unhappy moments with users. Moreover, content-distribution system may notify select users in a specific location area if certain spikes in reaction occur at a certain location and/or time. For example, a spike in excitement emotions for videos captured in the nearby mall may indicate a celebrity sighting. In addition, content-distribution system may be able to analyze a user's likes and dislikes over the course of time and geography to determine when a user is most happy and/or where a user is most happy.

In certain embodiments, a user in the social graph will also be associated with their captured video. The social graph may also be related to the content graph. With the categorization of the emotion associated with the video clip, a user in the social graph may structure video clips based on the user's associated emotion to the video clip. The user may even display the emotion associated with the captured video on the user's profile page. Moreover, a social networking system may automatically categorize a user's video clips on the user's profile page based in part on the categorization associated with the video clip that specifies the user's emotion.

Client device may also receive a request to list all video clips designated with a categorization specifying a selected emotion. Client device may access the metadata or files stored on client device or client device may communicate a search request to the content-distribution system. When client device accesses the metadata or files stored on client device, client device may identify any video clips that are categorized with the selected emotion. When client device communicates a search request to the content-distribution system for video clips designated with a categorization specifying a selected emotion, content-distribution system may, in turn, return a list of all video clips designated with the specific categorization. The list may be provided to the user by displaying a list of titles associated with the returned video clips, images of video frames in the video clips, a stream of the video clip, or any other type of display such that the user is provided with the list of video clips designated with the categorization specifying the selected emotion.

The user may also select one or more of the listed video clips in order to view the video clip. The user device, upon receiving the selection to display one or more video clips in the list, may display the video clip selected. In certain embodiments, the video clip may be displayed in conjunction with a representation of the emotion. For example, if the emotion associated with a video is love, a heart icon may be displayed in the lower right area of the video. Moreover, if a selected object in a video clip is associated with an emotion, the emotion may appear as an indicator to the object in the video clip. For example, a user may select a cute puppy as the object of the video and associates the puppy with an emotion of happiness. When a viewer views the recorded video, the happiness emotion may appear as a happy watermark or a smiley-face indicator on the selected puppy. The disclosure contemplates any type of visual, audible, or textual indication that indicates the selected emotion for a particular video clip.

A user that requests a list to all video clips designed with the categorization specifying the selected emotion may also have additional filters to assist in the search. For example, the list of videos may be filtered to limit the video clips. Examples of a filter include video clips that were captured within a specified time period, were associated with a specific location, comprise a viewer count that exceeds a specified minimum number of times by one or more users of one or more content-distribution systems, comprises annotations with one or more reactions associated with one or more users of one or more content-distribution systems, contains a prior selection of a detected object, or contains one or more detected objects represented by a first social-graph node connected to a second social-graph node representing a user associated with the client device.

FIG. 1 is an example user interface 100 of a client device that may capture a video clip by selecting an emotion capture button. In FIG. 1, emotion capture categories 110a-110b and emotion capture buttons 120a-120c are examples of unique identifiers in a user interface of a client application (or a web page).

User interface 100 may display a plurality of emotion capture categories 110a-110b. Each emotion capture category may represent a grouping of emotion capture buttons. For example, emotion capture category 110a is associated with emotion capture buttons 120a-120c. In certain embodiments, a user must first select an emotion capture category, such as emotion capture category 110a, to view emotion capture buttons, such as emotion capture buttons 120a-120c. In certain embodiments, emotion capture categories 110a-110b may also be used as an emotion capture button based on the length, timing, or lack of additional press after selecting emotion capture categories 110a-110b.

User interface 100 may display a grouping of emotion capture buttons 120a-120c after receiving a selection of an emotion capture category (e.g., emotion capture category 110a). In the illustrated embodiment, emotion capture category 110a is grouped with emotion capture buttons 120a-120c. In an example embodiment, a user selected emotion capture category 110a, and the user interface 100 was updated to display the grouping of emotion capture buttons 120a-120c.

Emotion capture buttons 120a-120c may be associated with an emotion. For example, in the illustrated embodiment, emotion capture button 120a is illustrated with a heart emoji, thereby depicting an emotion of love. Similarly, emotion capture button 120b is illustrated with a thumbs up emoji, thereby depicting an emotion of concurrence. Finally emotion capture button 120c is illustrated with a LOL emoji, thereby depicting an emotion of humor. Typically, each emotion capture button 120a-120c is associated with a separate emotion.

The user may select one of emotion capture buttons 120a-120c by tapping on emotion capture buttons 120a-120c. In certain embodiments, a selection of the an emotion capture button triggers the beginning of a video capture. In alternative embodiments, a user device may record a video so long as an emotion capture button selection is maintained.

Figure 2:
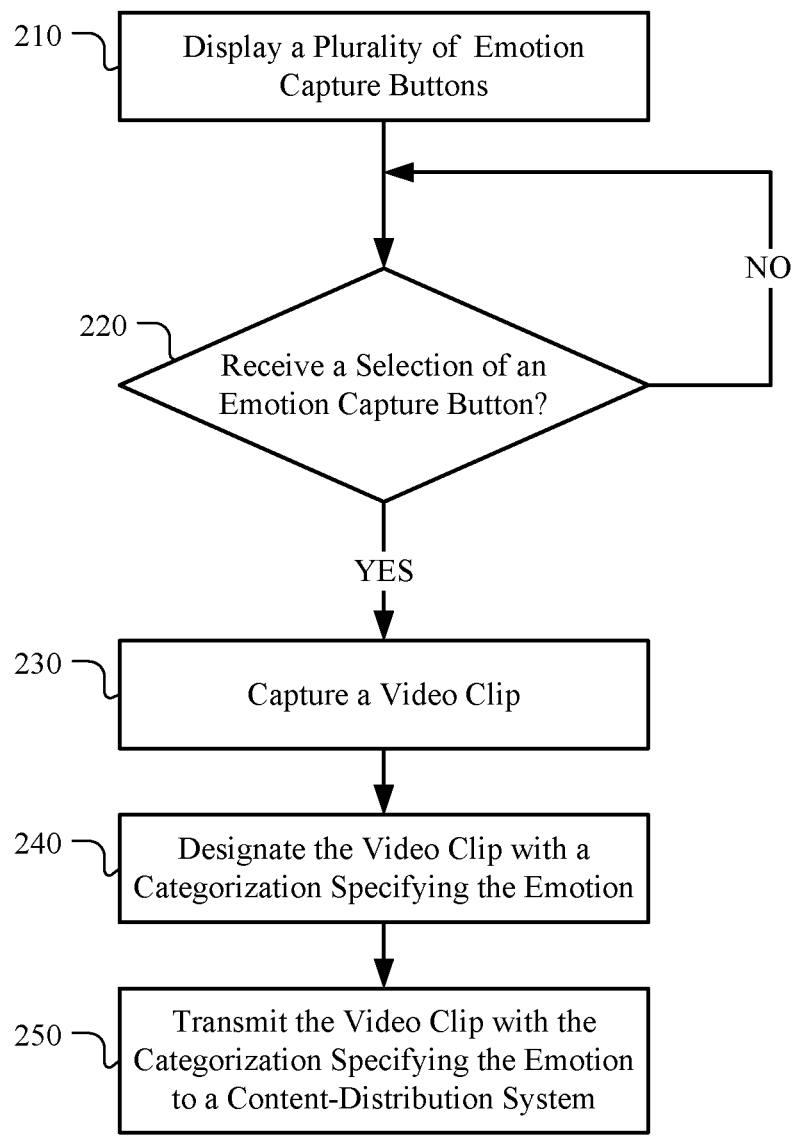
FIG. 2 illustrates an example method for capturing a video clip by selecting an emotion capture button.

FIG. 2 illustrates an example method 200 for capturing a video clip by selecting an emotion capture button. The method may begin at step 210, where a client device displays a plurality of emotion capture button, and the user may select an emotion capture button from the plurality of emotion capture buttons. In certain embodiments, the client device may display a single emotion capture button, and the user may select the single emotion capture button. The emotion capture button may be associated with an emotion, such as being happy or being disgusted. In certain embodiments, the emotion capture button is a graphical representation of the associated emotion, such as a smiley face or a poop emoji.

At step 220, a client device may receive a selection of an emotion capture button. If the client device does not receive a selection of an emotion capture button, client device will continue to display an emotion capture button until it receives a selection at step 220.

Otherwise, the client device will capture a video clip at step 230 in response to receiving the selection of the emotion capture button. Client device may capture a video clip by recording a video clip through an embedded camera, through an attached camera, by selecting a multimedia content on the client device, or any other method for client device to ascertain a video clip. In certain embodiments, the client device captures the video clip during the duration of the selection of the emotion capture button. In alternative embodiments, the video clip capture begins when the emotion capture button is selected.

Client device may also designate the video clip with a categorization specifying the emotion associated with the selected emotion capture categories at step 240. In certain embodiments, client device designates the video clip with a categorization by modifying the metadata of the video clip to include the emotion associated with the selected emotion capture button. The associated metadata may also include other information about the video, such as the location data and/or time associated with the video. In other embodiments, client device may modify a file associated with a video clip or a record associated with the video clip to include the emotion associated with the selected emotion capture button.

At step 250, the client device may transmit the video clip with the categorization specifying the emotion to a content-distribution system. Client device may instantaneously upload the emotion associated with the captured video while uploading the captured video to the content-distribution system. Various video information may also be associated with the captured video clip and transmitted to the content-distribution system. Video information may comprise location data associated with the captured video clip, time associated with the captured video clip, resolution associated with the captured video clip, detected objects associated with the captured video clip, the categorization specifying the emotion associated with the selected emotion capture button for the captured video clip, or any other information that may be relevant or associated with the captured video clip.

Video information may also include automatically captured information associated with the captured content. In certain embodiments, video information may also contain user-generated information (e.g., date, time, location, tags, etc.), EXIF data, and information generated by content-distribution system. For example, content-distribution system may access the EXIF data associated with captured content and generate video information from the EXIF data. For instance, content-distribution system may access the location data in EXIF data, and then associate the location data with a known specified location (e.g., "Half Dome, Yosemite National Park, California"). As another example, video information may comprise tags generated by capturing user or viewing users.

Particular embodiments may repeat one or more steps of the method of FIG. 2, where appropriate. Although this disclosure describes and illustrates particular steps of the method of FIG. 2 as occurring in a particular order, this disclosure contemplates any suitable steps of the method of FIG. 2 occurring in any suitable order. Moreover, although this disclosure describes and illustrates an example method for capturing a video clip by selecting an emotion capture button including the particular steps of the method of FIG. 2, this disclosure contemplates any suitable method for capturing a video clip that is designed with a categorization specifying the selected emotion including any suitable steps, which may include all, some, or none of the steps of the method of FIG. 2, where appropriate. Furthermore, although this disclosure describes and illustrates particular components, devices, or systems carrying out particular steps of the method of FIG. 2, this disclosure contemplates any suitable combination of any suitable components, devices, or systems carrying out any suitable steps of the method of FIG. 2.

Figure 3:
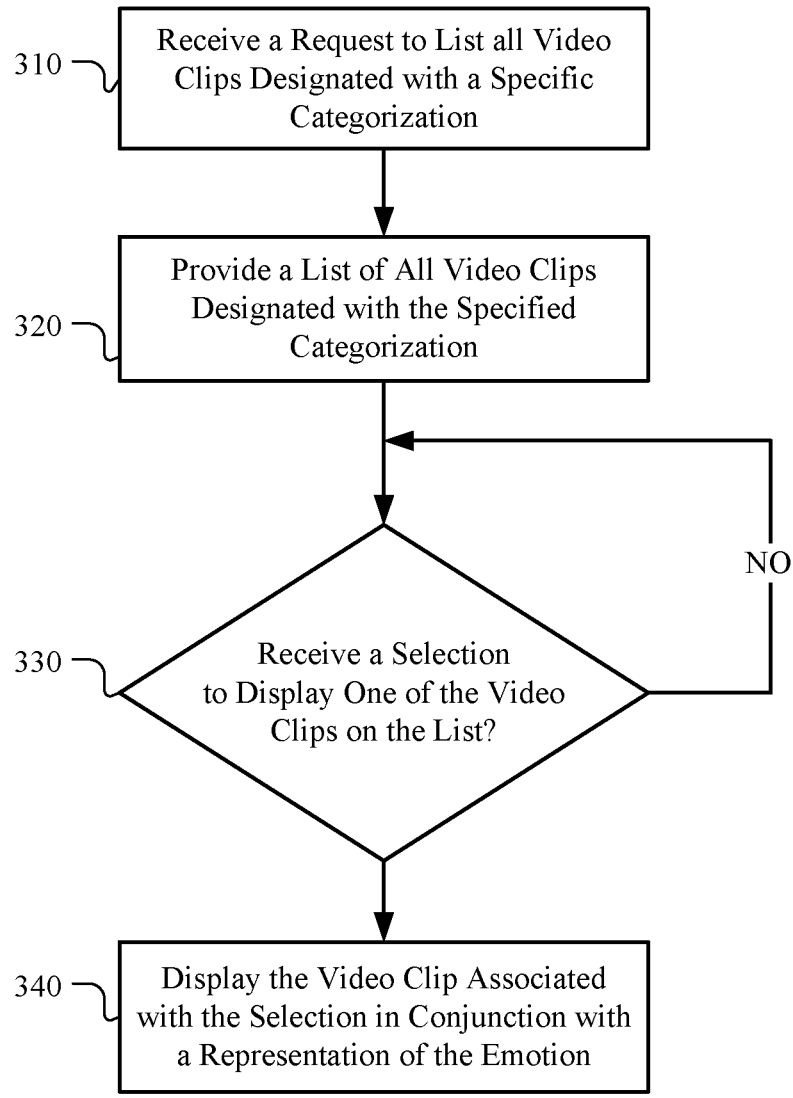
FIG. 3 illustrates an example method for displaying a list of video clips associated with a specific categorization.

FIG. 3 illustrates an example method 300 for displaying a list of video clips associated with a specific categorization. The method may begin at step 310, where a client device or content-distribution system receives a request to list all video clips designated with a specific categorization.

At step 320, client device or content-distribution system may provide a list of all video clips designated with the specific categorization. In certain embodiments, client device may access the metadata or files stored on client device or client device may communicate a search request to the content-distribution system. When client device accesses the metadata or files stored on client device, client device may identify any video clips that are categorized with the selected emotion. When client device communicates a search request to the content-distribution system for video clips designated with a categorization specifying a selected emotion, content-distribution system may, in turn, return a list of all video clips designated with the categorization specifying the selected emotion.

A user that requests a list to all video clips designed with the categorization specifying the selected emotion may have additional filters to assist in the search. For example, the list of videos may be filtered to limit the video clips that only include a prior selection of a detected object, one or more detected objects represented by a first social-graph node connected to a second social-graph node representing a user associated with the client device, within a specified time period, in association with a specified location, viewed a minimum number of times by one or more users of one or more content-distribution systems, or annotated with one or more reactions associated with one or more users of one or more content-distribution systems.

At step 330, a user may also select one or more of the listed video clips in order to view the video clip. If the client device or content-distribution system does not receive a selection of a video clip on the list, client device or content-distribution system will continue to display a list of all video clips designated with the specified categorization until it receives a selection at step 330.

At step 340, the client device, upon receiving the selection to display one of the video clips on the list, may display the selected video clip. In certain embodiments, the video clip may be displayed in conjunction with a representation of the emotion. Moreover, if a selected object in a video clip is associated with an emotion, the emotion may appear as an indicator to the object in the video clip.

Particular embodiments may repeat one or more steps of the method of FIG. 3, where appropriate. Although this disclosure describes and illustrates particular steps of the method of FIG. 3 as occurring in a particular order, this disclosure contemplates any suitable steps of the method of FIG. 3 occurring in any suitable order. Moreover, although this disclosure describes and illustrates an example method for displaying a list of video clips associated with a specific categorization including the particular steps of the method of FIG. 3, this disclosure contemplates any suitable method for displaying a list of video clips associated with a specific categorization including any suitable steps, which may include all, some, or none of the steps of the method of FIG. 3, where appropriate. Furthermore, although this disclosure describes and illustrates particular components, devices, or systems carrying out particular steps of the method of FIG. 3, this disclosure contemplates any suitable combination of any suitable components, devices, or systems carrying out any suitable steps of the method of FIG. 3.

FIG. 4 illustrates example content graph 400. In particular embodiments, a content-distribution system may store one or more content graphs 400 in one or more data stores. Content-distribution system may be a social-networking system, may be linked to a social-networking system, or may be a subset of a social-networking system. In particular embodiments, content graph 400 may include multiple nodes—which may include multiple capturing user nodes 402, multiple captured content nodes 404, and multiple viewing user nodes 406—and multiple edges 408 connecting the nodes. Example content graph 400 illustrated in FIG. 4 is shown, for didactic purposes, in a two-dimensional visual map representation. In particular embodiments, content-distribution system, client device, or third-party system may access content graph 400 for suitable applications. The nodes and edges of content graph 400 may be stored as data objects, for example, in a data store (such as a content-graph database). Such a data store may include one or more searchable or queryable indexes of nodes or edges of content graph 400.

In particular embodiments, a capturing user node 402 may correspond to a capturing user of content-distribution system that transmits a video clip with the categorization specifying the emotion to the content-distribution system.

In particular embodiments, a viewing user node 406 may correspond to a viewing user of the content-distribution system that reacts to a video clip with an emotion. The emotion and an identifier of the video clip may be sent from the viewing user's device to the content-distribution system.

As an example and not by way of limitation, a user corresponding to capturing user node 402 or viewing user node 406 may be an individual (human user), an entity (e.g., an enterprise, business, or third-party application), or a group (e.g., of individuals or entities) that interacts or communicates with or over content-distribution system. In particular embodiments, when a user registers for an account with a content-distribution system, content-distribution system may create either a capturing user node 402 and/or viewing user node 406 corresponding to the user and store the capturing user node 402 and/or viewing user nodes 406 in one or more data stores. Capturing user nodes 402 and viewing user nodes 406 described herein may, where appropriate, refer to registered users. In addition or as an alternative, capturing user nodes 402 and viewing user nodes 406 described herein may, where appropriate, refer to users that have not registered with content-distribution system. In particular embodiments, a capturing user node 402 and/or viewing user nodes 406 may be associated with information provided by a user or information gathered by various systems, including content-distribution system. In particular embodiments, a capturing user node 402 and/or viewing user node 406 may be associated with one or more data objects corresponding to information associated with a user. In particular embodiments, a capturing user node 402 and/or viewing user node 406 may correspond to one or more webpages.

In particular embodiments, a captured content node 404 may correspond to one or more video clips. The one or more video clips may be communicated by a user associated with capturing user node 402. A user may also transmit video information 414 associated with the captured video clip. As in the illustrated embodiment, video information 414 may comprise a location of an associated captured content node 404. As an example and not by way of limitation, video information 414 may correspond to a time associated with the captured video clip (such as, for example, the beginning time and end time of the video capture), resolution associated with the captured video clip, location data associated with the captured video clip (such as, for example, latitude and longitude coordinates, a movie theater, restaurant, landmark, or city); an entity (such as, for example, a person, business, group, sports team, or celebrity); an object (such as, for example, an object or concept identified in the video clip), or two or more such concepts.

In particular embodiments, a node in content graph 400 may represent or be represented by a webpage (which may be referred to as a "profile page"). Profile pages may be hosted by or accessible to a content-distribution system. Profile pages may also be hosted on third-party websites associated with a third-party system. As an example and not by way of limitation, a profile page corresponding to a particular external webpage may be the particular external webpage and the profile page may correspond to a particular capturing user node 402 and/or viewing user node 406. Profile pages may be viewable by all or a selected subset of other users. As an example and not by way of limitation, a capturing user node 402 and/or viewing user node 406 may have a corresponding user-profile page in which the corresponding user may add content, make declarations, or otherwise express himself or herself. As another example and not by way of limitation, a capturing user node 402 and/or viewing user node 406 may have a corresponding captured content-profile page in which one or more users may add content, make declarations, or express themselves, particularly in relation to the video clips corresponding to captured content node 404. In an exemplary embodiment, content-distribution system may automatically organize video clips on a profile page based in part on the user's associated reaction (as stored in captured user emotion 410 and/or viewing user emotion 412).

In particular embodiments, a pair of nodes in social graph 400 may be connected to each other by one or more edges 408. An edge 408 connecting a pair of nodes may represent a relationship between the pair of nodes. In particular embodiments, an edge 408 may include or represent one or more data objects or attributes corresponding to the relationship between a pair of nodes. An edge 408 may also be associated with a capturing user emotion 410 and/or viewing user emotion 412. A captured user emotion 410 represents a specified emotion by a capturing user (represented by capturing user node 402) in conjunction with a captured content (represented by captured content node 404). Similarly, a viewing user emotion 412 represents a specified emotion by a viewing user (represented by viewing user node 406) in conjunction with a captured content (represented by captured content node 404).

As an example and not by way of limitation, Capturing User A (associated with capturing user node 402a) may transmit video clip "dog with bone" (associated with captured content node 404a) along with a categorization that Capturing User A selected a "hearted" emotion for the video clip. Content-distribution system may then create an edge 408 between capturing user node 402a and captured content node 404a and store edge 408 as content-graph information in one or more data stores. Moreover, content-distribution system may attribute a "hearted" captured user emotion 410a to edge 408 and also store captured user emotion 410a in one or more data stores.

As an example and not by way of limitation, Viewing User A (associated with capturing user node 402a) may view the video clip "dog with bone" (associated with captured content node 404a). Viewing User A may communicate a "me too" reaction to the video, indicating that Viewing User A had the same reaction as the capturing user that transmitted the video. Accordingly, Viewing User A communicates a "hearted" emotion for the video clip, the same emotion transmitted by Capturing User A. Content-distribution system may then create an edge 408 between viewing user node 406a and captured content node 404a and store edge 408 as content-graph information in one or more data stores. Moreover, content-distribution system may attribute a "hearted" viewing user emotion 410a to edge 408 and also store captured user emotion 410a in one or more data stores.

In certain embodiments, edge 408 may connect one or more captured content nodes 404. For example, content node 404b and content node 404c are connected by edge 408 because video information 414 establishes a relationship that both video clips were captured at Half Dome, Yosemite National Park, Calif. Content-distribution system may store edge 408 and video information 414 in one or more data stores.

Video information 414 may also include automatically captured information associated with the captured content 404. In certain embodiments, video information 414 may also contain user-generated information (e.g., date, time, location, tags, etc.), EXIF data, and information generated by content-distribution system. For example, content-distribution system may access the EXIF data associated with captured content 404 and generate video information 414 from the EXIF data. For instance, content-distribution system may access the location data in EXIF data, and then associate the location data with a known specified location (e.g., "Half Dome, Yosemite National Park, California"). As another example, video information 414 may comprise tags generated by capturing user 402a or viewing users 406.

Although this disclosure describes or illustrates particular edges 408 with particular attributes connecting particular nodes 402, 404, and 406, this disclosure contemplates any suitable edges 408 with any suitable attributes connecting nodes 402, 404, and 406.

Moreover, this disclosure contemplates any suitable edges 408 with any suitable attributes connecting capturing user nodes 402, captured content nodes 404, and viewing user nodes 406. Moreover, although this disclosure describes edges between a capturing user node 402, a captured content node 404, and a viewing user node 406 representing a single relationship, this disclosure contemplates edges between a capturing user node 402, captured content node 404, and a viewing user node 406 representing one or more relationships.

Figure 5:
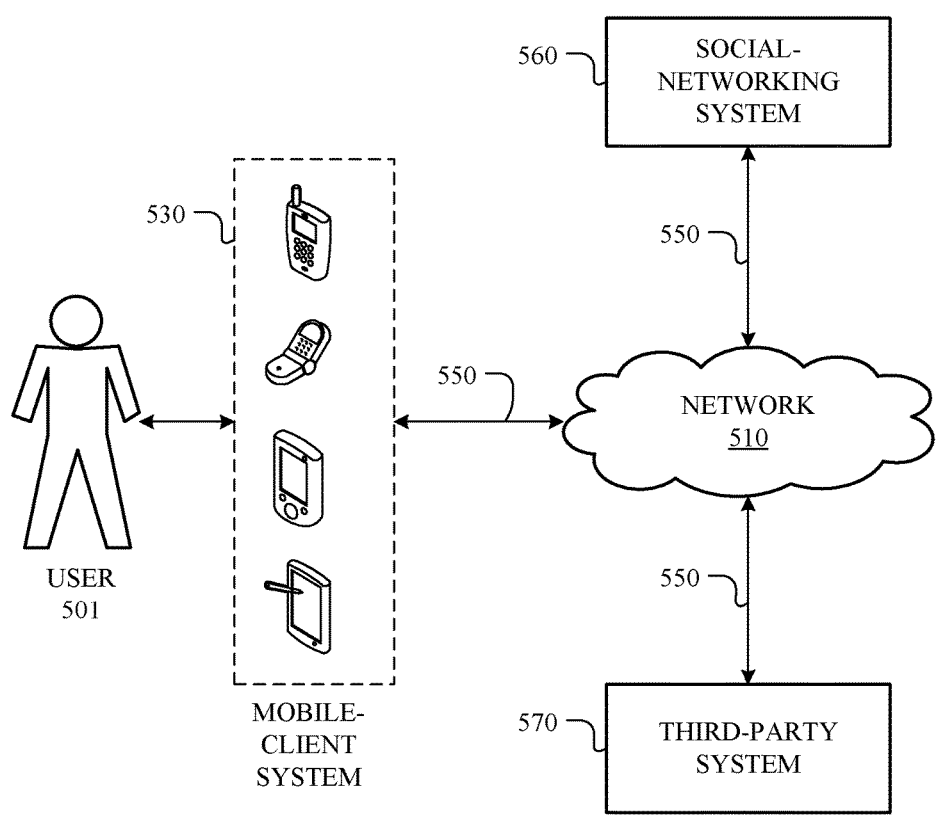
FIG. 5 illustrates an example network environment associated with a social-networking system.

FIG. 5 illustrates an example network environment 500 associated with a social-networking system. Network environment 500 includes a user 501, a client system 530, a social-networking system 560, and a third-party system 570 connected to each other by a network 510. Although FIG. 5 illustrates a particular arrangement of user 501, client system 530, social-networking system 560, third-party system 570, and network 510, this disclosure contemplates any suitable arrangement of user 501, client system 530, social-networking system 560, third-party system 570, and network 510. As an example and not by way of limitation, two or more of client system 530, social-networking system 560, and third-party system 570 may be connected to each other directly, bypassing network 510. As another example, two or more of client system 530, social-networking system 560, and third-party system 570 may be physically or logically co-located with each other in whole or in part. Moreover, although FIG. 5 illustrates a particular number of users 501, client systems 530, social-networking systems 560, third-party systems 570, and networks 510, this disclosure contemplates any suitable number of users 501, client systems 530, social-networking systems 560, third-party systems 570, and networks 510. As an example and not by way of limitation, network environment 500 may include multiple users 501, client system 530, social-networking systems 560, third-party systems 570, and networks 510.

In particular embodiments, user 501 may be an individual (human user), an entity (e.g., an enterprise, business, or third-party application), or a group (e.g., of individuals or entities) that interacts or communicates with or over social-networking system 560. In particular embodiments, social-networking system 560 may be a network-addressable computing system hosting an online social network. Social-networking system 560 may generate, store, receive, and send social-networking data, such as, for example, user-profile data, concept-profile data, social-graph information, or other suitable data related to the online social network. Social-networking system 560 may be accessed by the other components of network environment 500 either directly or via network 510. In particular embodiments, social-networking system 560 may include an authorization server (or other suitable component(s)) that allows users 501 to opt in to or opt out of having their actions logged by social-networking system 560 or shared with other systems (e.g., third-party systems 570), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users of social-networking system 30 through blocking, data hashing, anonymization, or other suitable techniques as appropriate. In particular embodiments, third-party system 570 may be a network-addressable computing system that can host a content-distribution system. Third-party system 570 may generate, store, receive, and send captured content 404, such as, for example, a video clip of a dog with a bone. Third-party system 570 may be accessed by the other components of network environment 500 either directly or via network 510. In particular embodiments, one or more users 501 may use one or more client systems 530 to access, send data to, and receive data from social-networking system 560 or third-party system 570. Client system 530 may access social-networking system 560 or third-party system 570 directly, via network 510, or via a third-party system. As an example and not by way of limitation, client system 530 may access third-party system 570 via social-networking system 560. Client system 530 may be any suitable computing device, such as, for example, a personal computer, a laptop computer, a cellular telephone, a smartphone, a tablet computer, or an augmented/virtual reality device.

This disclosure contemplates any suitable network 510. As an example and not by way of limitation, one or more portions of network 510 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 510 may include one or more networks 510.

Links 550 may connect client system 530, social-networking system 560, and third-party system 570 to communication network 510 or to each other. This disclosure contemplates any suitable links 550. In particular embodiments, one or more links 550 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 550 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 550, or a combination of two or more such links 550. Links 550 need not necessarily be the same throughout network environment 500. One or more first links 550 may differ in one or more respects from one or more second links 550.

Figure 6:
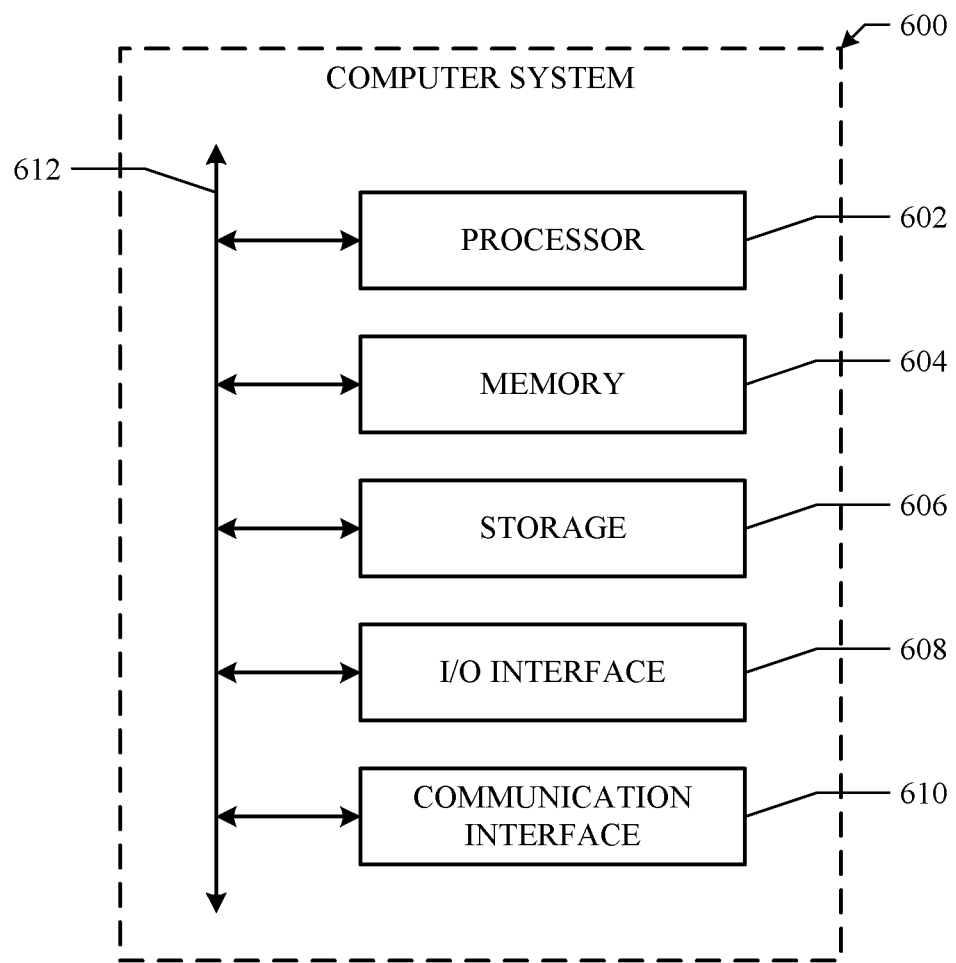
FIG. 6 illustrates an example computer system.

FIG. 6 illustrates an example computer system 600. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600. Herein, reference to a computer system may encompass a computing device, and vice versa, where appropriate. Moreover, reference to a computer system may encompass one or more computer systems, where appropriate.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 600 may include one or more computer systems 600; be unitary or distributed; span multiple locations; span multiple machines; span multiple data centers; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include a hard disk drive (HDD), a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both, providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method, comprising:
   by a client device, receiving a user selection of an emotion capture button displayed in a user interface of the client device, wherein the emotion capture button is associated with an emotion;
   by the client device, in response to the receiving the user selection of the emotion capture button, capturing a video clip displayed to a user, wherein the video clip corresponds to the user-selected emotion capture button; and
   by the client device, designating the video clip with a categorization specifying the emotion associated with the user-selected emotion capture button.

2. The method of claim 1, further comprising transmitting the captured video clip with the categorization specifying the emotion to a content-distribution system.

3. The method of claim 2, further comprising:
  receiving a selection of an object detected in the video clip; and
  transmitting the selection to the content-distribution system.

4. The method of claim 1, further comprising storing, on the client device, the categorization specifying the emotion in metadata associated with a file containing the captured video clip.

5. The method of claim 1, further comprising:
  displaying a plurality of emotion capture categories, each representing a grouping of emotion capture buttons;
  receiving user input in conjunction with a selected one of the emotion capture categories; and
  displaying the grouping of emotion capture buttons represented by the user-selected emotion capture category, wherein the user selection of an emotion capture button comprises a user selection of one of the emotion capture buttons in the grouping represented by the user-selected emotion capture category.

6. The method of claim 1, further comprising:
  receiving a request to list all video clips designated with a categorization specifying a selected emotion;
  providing a list of all video clips designated with a categorization specifying the selected emotion;
  receiving a selection to display one of the video clips in the list; and
  displaying the video clip associated with the selection in conjunction with a representation of the emotion.

7. The method of claim 6, wherein the request to list all video clips designated with the categorization specifying the selected emotion further comprises a filter to limit the list to all video clips:
  including a prior selection of a detected object;
  including one or more detected objects represented by a first social-graph node connected to a second social-graph node representing a user associated with the client device;
  captured within a specified time period;
  captured in association with a specified location;
  that have been viewed a minimum number of times by one or more users of one or more content-distribution systems; or
  annotated with one or more reactions associated with one or more users of one or more content-distribution systems.

8. The method of claim 1, further comprising:
  identifying a visual feature in the captured video clip;
  associate the visual feature with a concept; and
  storing, on the client device, the concept in metadata associated with a file containing the captured video clip.

9. The method of claim 1, further comprising transmitting video information associated with the captured video clip to a content-distribution system, wherein the video information associated with the captured video clip comprises at least one of the following:
  location data associated with the captured video clip;
  time associated with the captured video clip;
  resolution associated with the captured video clip;
  detected objects associated with the captured video clip; or
  the categorization specifying the emotion associated with the user-selected emotion capture button for the captured video clip.

10. One or more computer-readable non-transitory storage media embodying software that is operable when executed to:
  receive a user selection of an emotion capture button displayed in a user interface of a client device, wherein the emotion capture button is associated with an emotion;
  in response to the receiving the user selection of the emotion capture button, capture a video clip displayed to a user, wherein the video clip corresponds to the user-selected emotion capture button; and
  designate the video clip with a categorization specifying the emotion associated with the user-selected emotion capture button.

11. The media of claim 10, wherein the software is further operable when executed to transmit the captured video clip with the categorization specifying the emotion to a content-distribution system.

12. The media of claim 11, wherein the software is further operable when executed to:
  receive a selection of an object detected in the video clip; and
  transmit the selection to the content-distribution system.

13. The media of claim 10, wherein the software is further operable when executed to store the categorization specifying the emotion in metadata associated with a file containing the captured video clip.

14. The media of claim 10, wherein the software is further operable when executed to:
  display a plurality of emotion capture categories, each representing a grouping of emotion capture buttons;
  receive user input in conjunction with a selected one of the emotion capture categories; and
  display the grouping of emotion capture buttons represented by the user-selected emotion capture category, wherein the user selection of an emotion capture button comprises a user selection of one of the emotion capture buttons in the grouping represented by the user-selected emotion capture category.

15. The media of claim 10, wherein the software is further operable when executed to:
  receive a request to list all video clips designated with a categorization specifying a selected emotion;
  provide a list of all video clips designated with a categorization specifying the selected emotion;
  receive a selection to display one of the video clips in the list; and
  display the video clip associated with the selection in conjunction with a representation of the emotion.

16. The media of claim 15, wherein the request to list all video clips designated with the categorization specifying the selected emotion further comprises a filter to limit the list to all video clips:
  including a prior selection of a detected object;
  including one or more detected objects represented by a first social-graph node connected to a second social-graph node representing a user associated with the client device;
  captured within a specified time period;
  captured in association with a specified location;
  that have been viewed a minimum number of times by one or more users of one or more content-distribution systems; or
  annotated with one or more reactions associated with one or more users of one or more content-distribution systems.

17. The media of claim 10, wherein the software is further operable when executed to:
   identify a visual feature in the captured video clip;
   associate the visual feature with a concept; and
   store the concept in metadata associated with a file containing the captured video clip.

18. The media of claim 10, wherein the software is further operable when executed to transmit video information associated with the captured video clip to a content-distribution system, wherein the video information associated with the captured video clip comprises at least one of the following:
   location data associated with the captured video clip;
   time associated with the captured video clip;
   resolution associated with the captured video clip;
   detected objects associated with the captured video clip; or
   the categorization specifying the emotion associated with the user-selected emotion capture button for the captured video clip.

19. A system comprising: one or more processors; and a memory coupled to the processors comprising instructions executable by the processors, the processors being operable when executing the instructions to:
   receive a user selection of an emotion capture button displayed in a user interface of a client device, wherein the emotion capture button is associated with an emotion;
   in response to the receiving the user selection of the emotion capture button, capture a video clip displayed to a user, wherein the video clip corresponds to the user-selected emotion capture button; and
   designate the video clip with a categorization specifying the emotion associated with the user-selected emotion capture button.

20. The system of claim 19, wherein the processors are further operable when executing the instructions to transmit the captured video clip with the categorization specifying the emotion to a content-distribution system.

21. The system of claim 20, wherein the processors are further operable when executing the instructions to:
   receive a selection of an object detected in the video clip; and
   transmit the selection to the content-distribution system.

22. The system of claim 19, wherein the processors are further operable when executing the instructions to store the categorization specifying the emotion in metadata associated with a file containing the captured video clip.

23. The system of claim 19, wherein the processors are further operable when executing the instructions to:
   display a plurality of emotion capture categories, each representing a grouping of emotion capture buttons;
   receive user input in conjunction with a selected one of the emotion capture categories; and
   display the grouping of emotion capture buttons represented by the user-selected emotion capture category, wherein the user selection of an emotion capture button comprises a user selection of one of the emotion capture buttons in the grouping represented by the user-selected emotion capture category.

24. The system of claim 19, wherein the processors are further operable when executing the instructions to:
   receive a request to list all video clips designated with a categorization specifying a selected emotion;
   provide a list of all video clips designated with a categorization specifying the selected emotion;
   receive a selection to display one of the video clips in the list; and
   display the video clip associated with the selection in conjunction with a representation of the emotion.

25. The system of claim 24, wherein the request to list all video clips designated with the categorization specifying the selected emotion further comprises a filter to limit the list to all video clips:
   including a prior selection of a detected object;
   including one or more detected objects represented by a first social-graph node connected to a second social-graph node representing a user associated with the client device;
   captured within a specified time period;
   captured in association with a specified location;
   that have been viewed a minimum number of times by one or more users of one or more content-distribution systems; or
   annotated with one or more reactions associated with one or more users of one or more content-distribution systems.

26. The system of claim 19, wherein the processors are further operable when executing the instructions to:
   identify a visual feature in the captured video clip;
   associate the visual feature with a concept; and
   store the detected concept in metadata associated with a file containing the captured video clip.

27. The system of claim 19, wherein the processors are further operable when executing the instructions to transmit video information associated with the captured video clip to a content-distribution system, wherein the video information associated with the captured video clip comprises at least one of the following:
   location data associated with the captured video clip;
   time associated with the captured video clip;
   resolution associated with the captured video clip;
   detected objects associated with the captured video clip; or
   the categorization specifying the emotion associated with the user-selected emotion capture button for the captured video clip.

* * * * *